(12) United States Patent
Nance

(10) Patent No.: US 7,575,389 B2
(45) Date of Patent: Aug. 18, 2009

(54) MAGNETIC COUPLING DEVICE

(75) Inventor: Thomas A. Nance, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 12 days.

(21) Appl. No.: 11/299,448

(22) Filed: Dec. 8, 2005

(65) Prior Publication Data

US 2007/0134061 A1    Jun. 14, 2007

(51) Int. Cl.
    *F16B 7/10* (2006.01)
(52) U.S. Cl. ............. 403/109.2; 403/109.7; 403/DIG. 1
(58) Field of Classification Search ... 403/109.1–109.8, 403/DIG. 1; 292/137, 163
    See application file for complete search history.

(56) References Cited

U.S. PATENT DOCUMENTS

| | | | |
|---|---|---|---|
| 3,779,052 A | 12/1973 | Deitch | |
| 4,078,709 A * | 3/1978 | Jenkins | ....................... 226/180 |
| 4,253,320 A | 3/1981 | Schwab et al. | |
| 4,380,162 A | 4/1983 | Woolfson | |
| 4,425,771 A | 1/1984 | Beach et al. | |
| 4,627,251 A | 12/1986 | Bhate | |
| 4,987,754 A | 1/1991 | Minasy et al. | |
| 5,077,872 A | 1/1992 | Guthammar | |
| 5,377,392 A | 1/1995 | Morita | |
| 5,600,977 A | 2/1997 | Piron | |
| 5,868,445 A | 2/1999 | Kaufman et al. | |
| 5,937,487 A | 8/1999 | Bauer | |
| 6,084,498 A * | 7/2000 | Stelter et al. | ................. 335/306 |
| 6,182,336 B1 | 2/2001 | Bauer | |
| 6,481,254 B1 | 11/2002 | Zheng et al. | |
| 2004/0208687 A1* | 10/2004 | Sicz et al. | ................. 403/109.3 |

FOREIGN PATENT DOCUMENTS

WO    WO 02/060292 A1    8/2002

* cited by examiner

*Primary Examiner*—Victor MacArthur
(74) *Attorney, Agent, or Firm*—J. Bennett Mullinax, LLC

(57) ABSTRACT

A quick connect/disconnect coupling apparatus is provided in which a base member is engaged by a locking housing through a series of interengagement pins. The pins maintain the shaft in a locked position. Upon exposure to an appropriately positioned magnetic field, pins are removed a sufficient distance such that the shaft may be withdrawn from the locking housing. The ability to lock and unlock the connector assembly requires no additional tools or parts apart from a magnetic key.

7 Claims, 10 Drawing Sheets

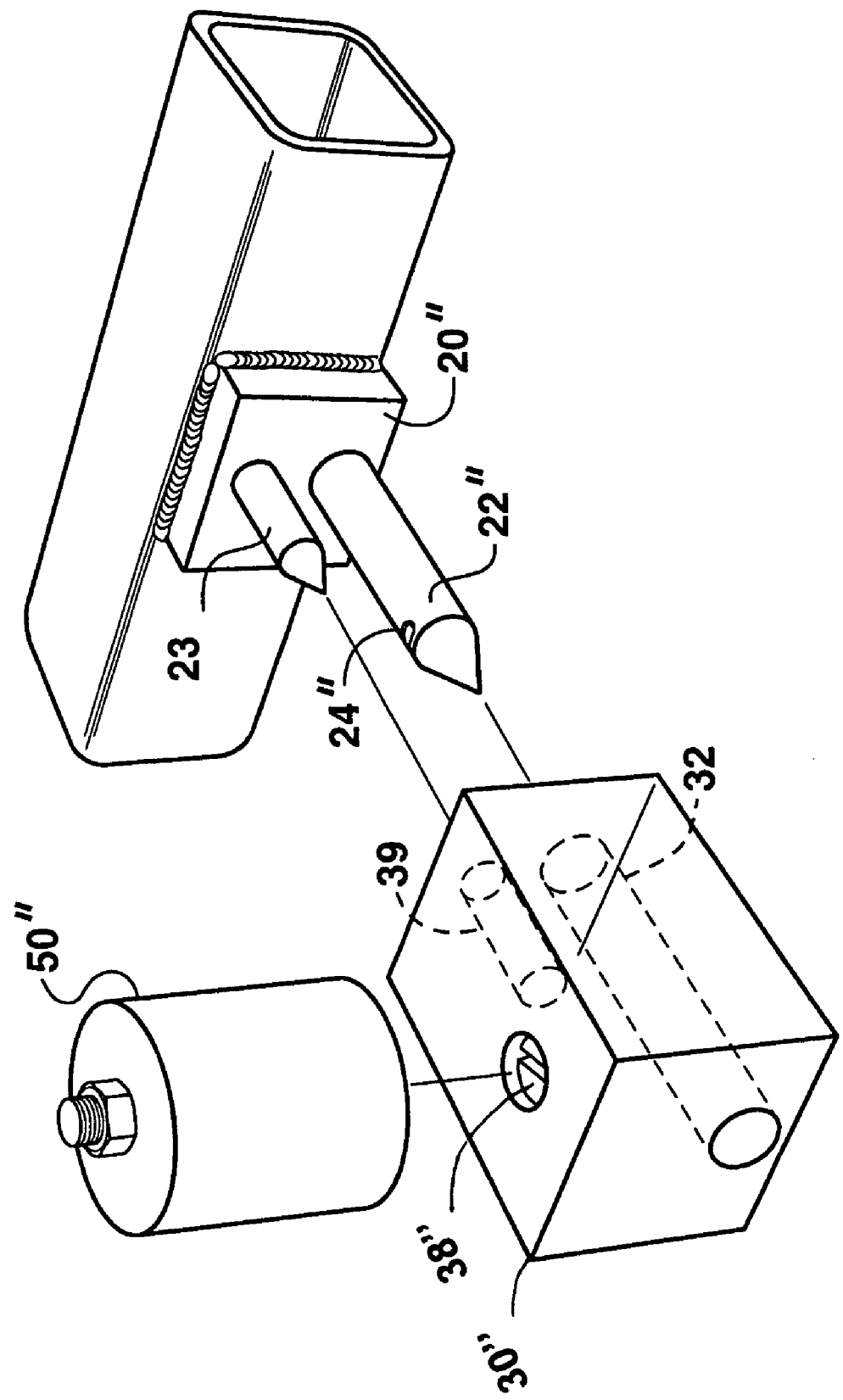

MAGNETIC COUPLING DEVICE

This invention was made with Government support under Contract No. DE-AC0996-SR18500 awarded by the United States Department of Energy. The Government has certain rights in the invention.

FIELD OF THE INVENTION

This invention is directed towards a quick release coupling/decoupling device.

BACKGROUND OF THE INVENTION

This invention is directed towards a coupling device in which magnets are used to release an interengagement between a shaft and a correspondingly mated receptacle.

There are a variety of connecting mechanisms and structures known in the art to facilitate joining one structure to another. Included among these connectors are quick release and quick assembly connectors which are designed to permit fastening between two structural members in a rapid fashion. However, such fastening techniques and structures frequently rely upon some type of engagement pin, external screw or bolt, or other structural locking member that must be manually inserted and/or removed for assembly. To the extent accessory parts such as screws, bolts, or pins must be manually inserted or removed for assembly and disassembly, such items are prone to being lost or misplaced. In addition, where a needed or desired coupling is in a hazardous environment such as in proximity to a radiation source or hazardous chemicals, the additional time required for insertion or removal of small parts results in greater exposure time of workers to potentially hazardous conditions.

Other connectors are designed to mate quickly but lack any type of securement or locking mechanism to either increase the safety of the mated interengagement or to prevent unauthorized tampering or theft of the associated articles. As various physical locking mechanisms are utilized to increase the strength of the attachment or to make the resulting attachment resistant to theft or vandalism, prior art designs require greater time and effort in the manual assembly and disassembly of such connectors.

There are a variety of magnetic closures known in the art which require an external magnet to release a latching mechanism. One such device is set forth in WIPO publication WO 02/060292 which describes a magnetic closure in which an external key magnet is rotated by a turn axis and thereby rotates internal key magnets within the closure mechanism.

U.S. Pat. No. 4,987,754 is directed to a magnetically releasable lock suitable for use with an electronic security sensor tag for merchandise. To remove the inventory control tag, a magnet is used to vary positions of catches relative to the shank of the pin and allowing the tag to be removed.

The prior art does not provide for a magnetic coupling device with a quick magnetic release that is suitable for industrial type applications. Further, the prior does not provide for quick disconnect coupling devices having magnetic releases with security safeguards to prevent unauthorized tampering or removal of the quick disconnect coupling.

Accordingly, there remains room for improvement and variation within the art.

SUMMARY OF THE INVENTION

It is an aspect of at least one embodiment of the present invention to provide for a quick connect/disconnect coupling device in which retaining members are disengaged by application of an electromagnetic field.

It is another aspect of at least one embodiment of the present invention to provide for a quick release coupling in which the insertion of a base member into a locking housing provides for an automatic physical interengagement lock between the structures.

It is a further aspect of at least one embodiment of the present invention to provide for a quick release coupling in which a magnetic key having a select orientation of supplied magnetic fields is needed to unlock the interengagement members of the coupling apparatus.

It is a further aspect of at least one embodiment of the present invention to provide for a quick release coupling apparatus which provides for fluid communication between the respective base member and a locking housing.

It is a further aspect of at least one embodiment of the present invention to provide for a coupling apparatus which facilitates a joining of two structural members in a locked manner without the use of accessory tools.

It is yet a further aspect of at least one embodiment of the present invention to provide for a coupling apparatus which may only be unlocked through the use of an external magnetic key.

It is yet a further aspect of at least one embodiment of the present invention to provide a magnetic coupling apparatus comprising at least one shaft member, the shaft member defining a base and a tip at opposite ends of the shaft member; a recess defined on an external portion of the shaft member; a lock housing, the lock housing defining an opening therein, the opening adapted for receiving the shaft; and, at least one interengagement member carried within the housing and in communication with the opening, the interengagement member adapted for engaging the at least one recess, the interengagement member responsive to an external magnetic force wherein the interengagement member is positioned between an engaged position within the recess and a disengaged position relative to the recess, the disengaged position occurring in response to an external magnet.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 6A and 6B set forth an additional embodiment of a quick release connector which provides an alignment pin on the base member which is adapted for engaging a corresponding aperture on the locking housing such that proper orientation of the component parts is provided.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment may be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
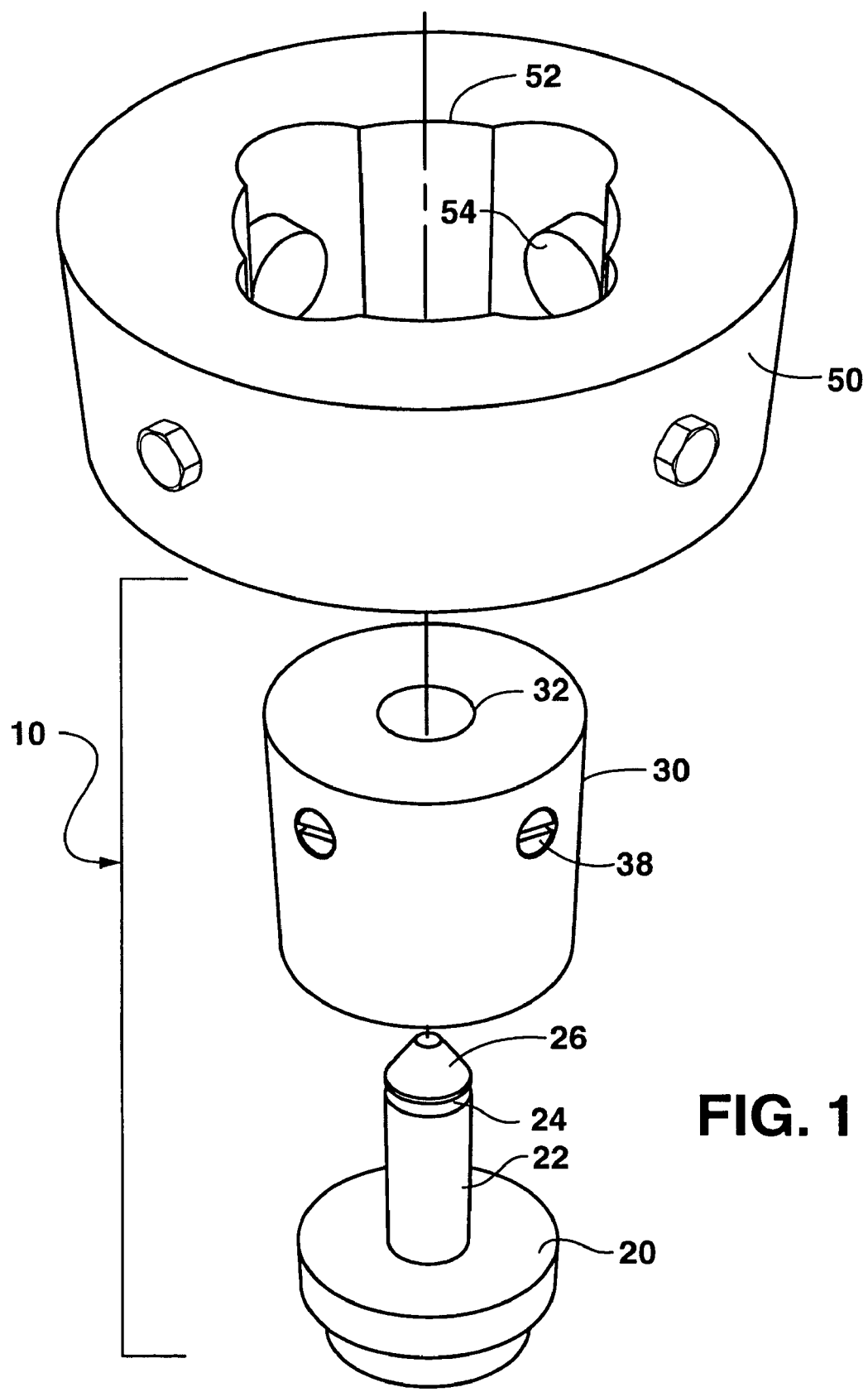
FIG. 1 is a perspective view of the components of a quick disconnect coupling device and key.

Set forth in FIG. 1 is an exploded perspective view of a quick release magnetic coupling 10 and associated magnetic key 50. The quick release coupling 10 is comprised of shaft 22 seen here in the form of a circular shaft which has a base member 20 at one end of shaft 22. While base member 20 is seen as an enlarged portion relative to the terminus of shaft 22, base member 20 may include any structure connected in a similar location to shaft 22 and would include a configuration where base 20 is merely the terminal end of shaft 22.

At least one recess 24 is defined in an exterior wall portion of shaft 22. As seen in the embodiment set forth in FIG. 1, recess 24 may be in the form of a circumferential groove which extends around shaft 22. Shaft 22 further defines a terminal tip 26 which may have tapered edge walls to facilitate alignment and insertion of the shaft within a locking housing 30.

Figure 2:
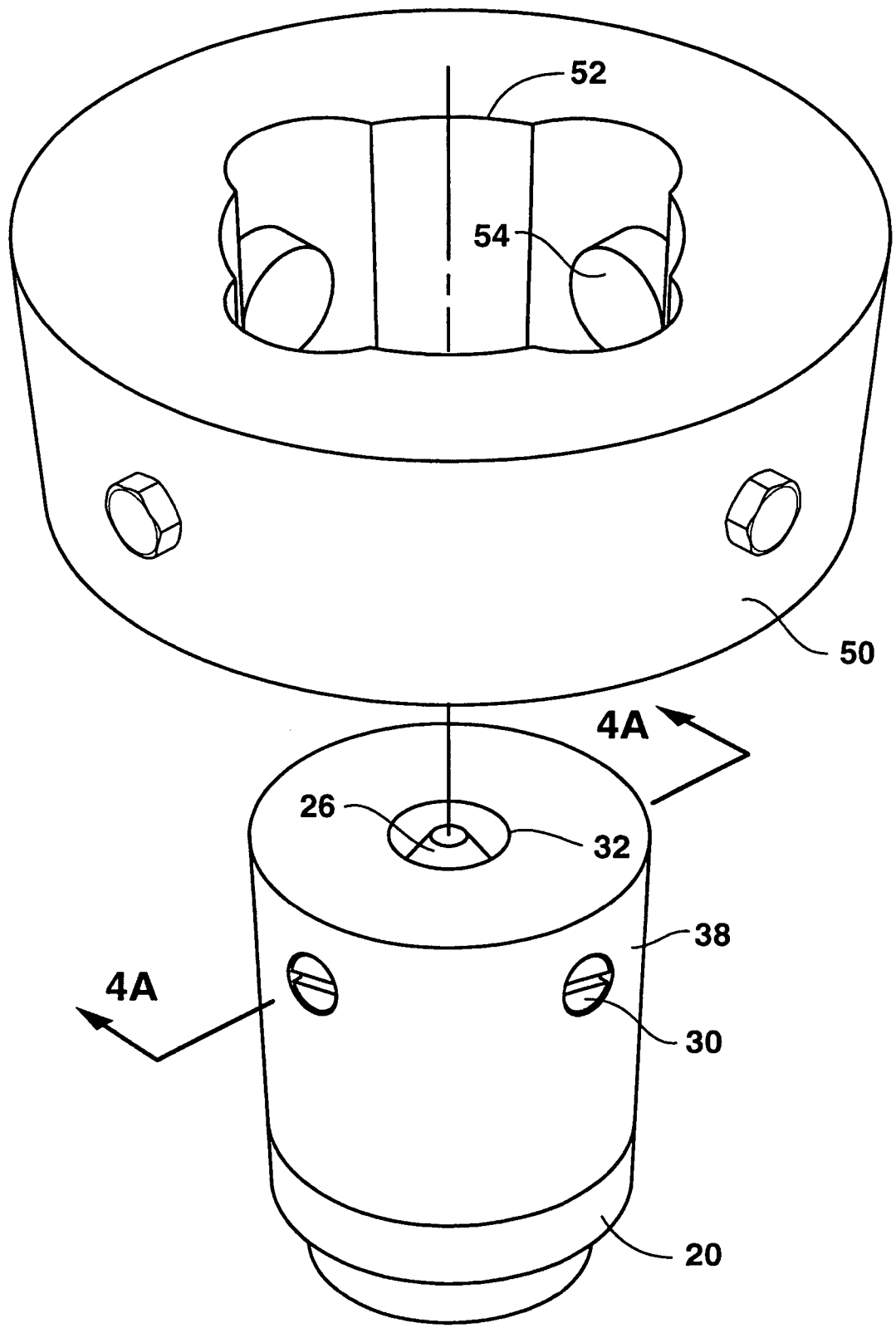
FIG. 2 is a perspective view of the coupling device seen in FIG. 1 in which the base member is placed within said locking housing and shown relative to a magnetic key.

Housing 30 defines a bore 32 which, in the illustrated embodiment, as best seen in reference to FIG. 2, traverses housing 30. However, it is envisioned that bore 32 could extend only partway through base 30 and would, in fact, be a preferred arrangement for certain end uses.

Figure 4A:
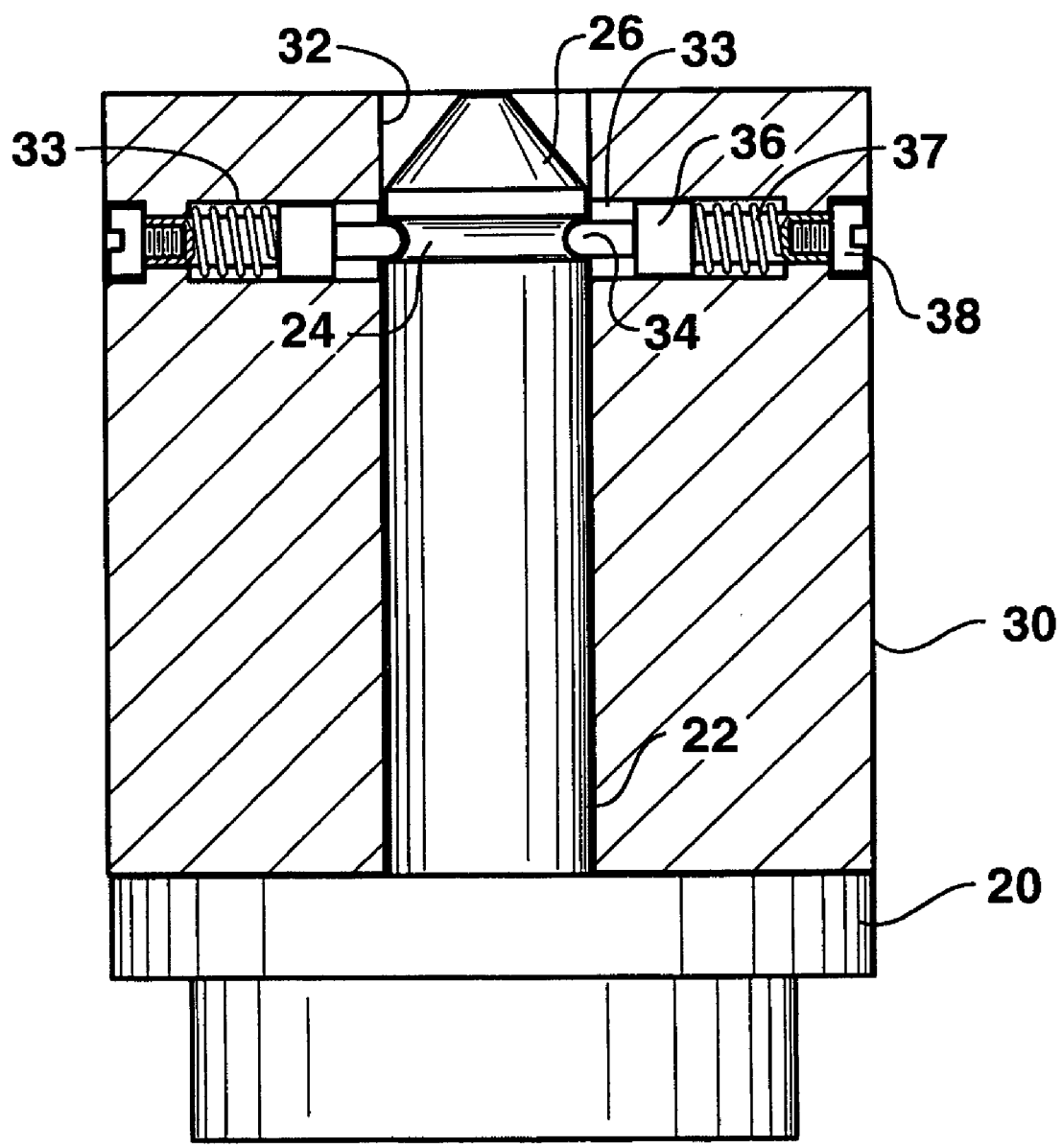
FIG. 4A is a sectional view taken along reference line 4A-4A as seen in FIG. 2.
Figure 4B:
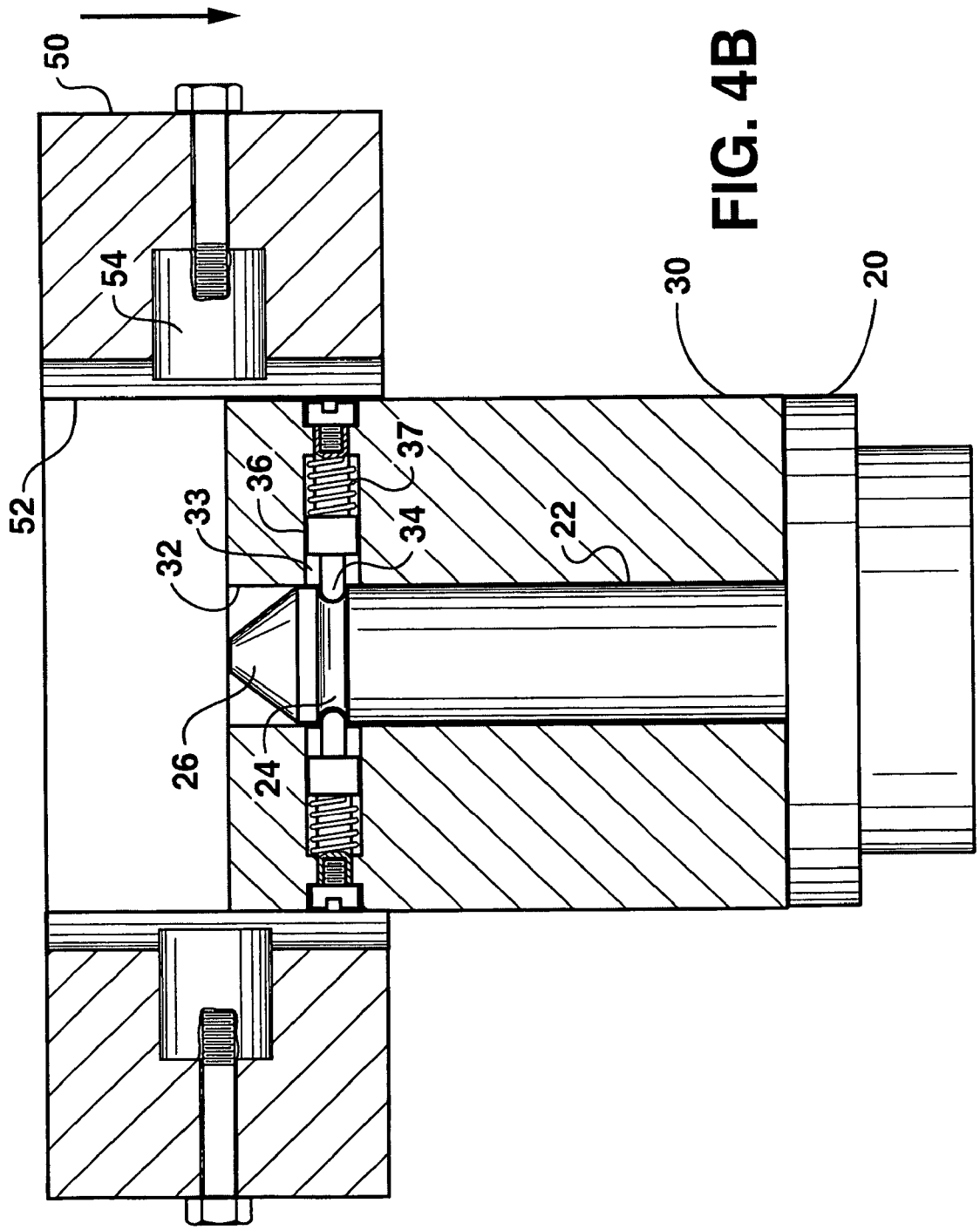
FIG. 4B is a view similar to FIG. 4A showing the additional feature of the magnetic key being placed over the locking member.
Figure 4C:
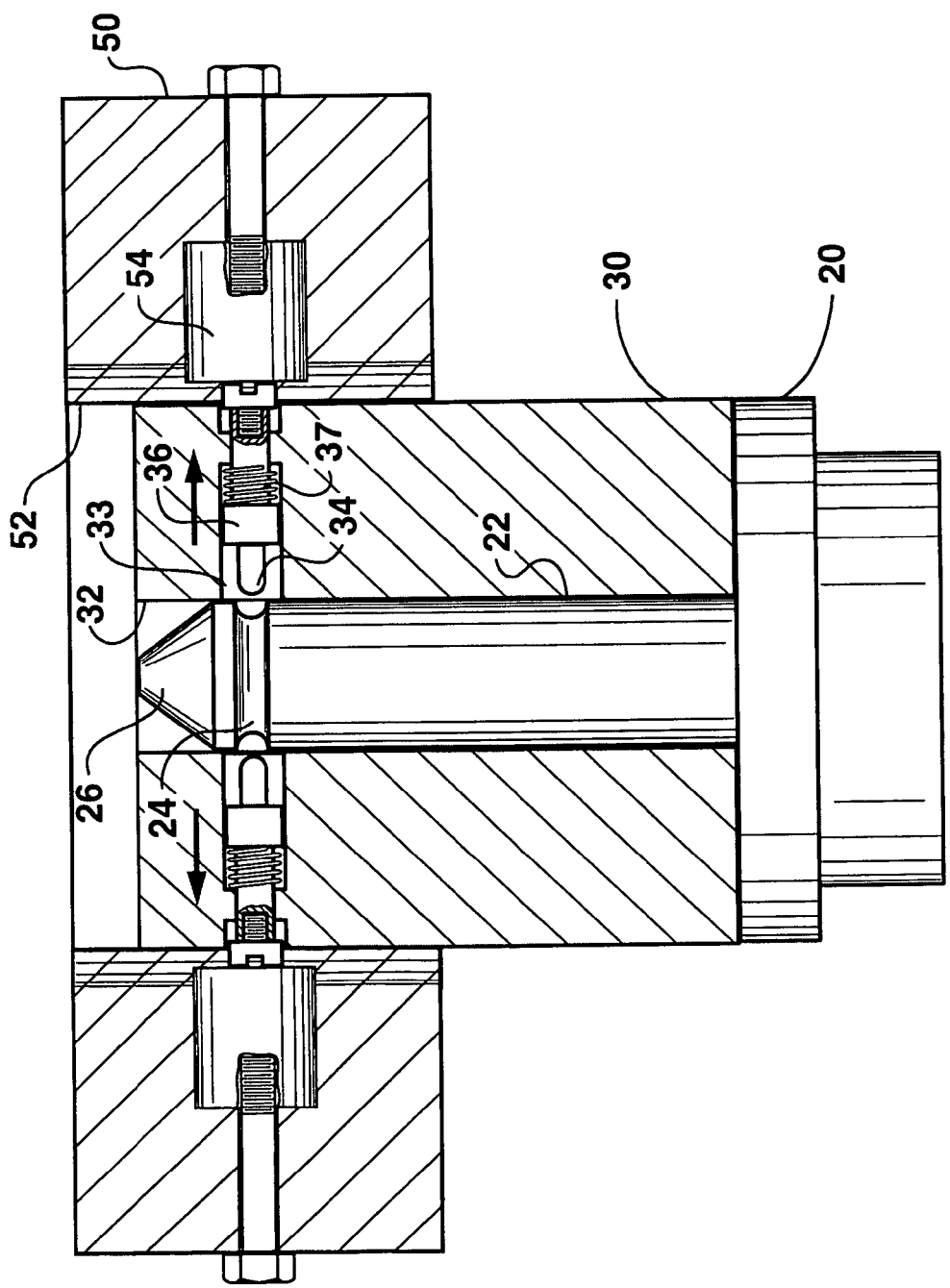
FIG. 4C is a sectional view taken along line 4C-4C as seen in reference to FIG. 3.

As best seen in reference to FIG. 4A, an interengagement between base member 20 and a locking housing 30 is set forth. One or more lateral passageways 33 are defined within locking housing 30 and are in communication with an interior of bore 32. Within each passageway 33, there is an interengagement member seen in the present embodiment as comprising a pin tip 34 and a pin base 36. The pin base 36 and pin tip 34 are maintained in position by a set screw 38 which is in operative engagement with a spring 37. Set screw 38 may be used to vary the amount of tension which spring 37 exerts upon pin base 36. As illustrated in FIG. 4A, pin tips 34 are under sufficient force such that the terminal ends of pin tip 34 extend into the interior of bore 32. As the tapered tip 26 is inserted into the bore 32, the pin tips 34 are displaced within the interior of passageways 33. When recess 24 is positioned opposite passageways 33, the force of spring 37 pushes pin tips 34 and pin base 36 in the direction of bore 32. Pin tips 34 thus engage recess 24 preventing axial movement of the shaft 22 relative to bore 32.

Additional types of interengagement members would include leaf springs, spring clips, flat springs, and extension springs, as well as other resistive-type movement which is responsive to a magnetic field. Further, recess 24 may have a rounded configuration as seen in FIG. 4A or may have more angled "squared off" edges as set forth as recess 24' as seen in the embodiment depicted in FIG. 7.

As is readily appreciated by one having ordinary skill in the art, the shape of the recess 24 relative to the corresponding pin tip 34 will influence the strength of the interengagement. A more rounded recess 24 will facilitate separation of the components under a load or relative tension between the component parts. A more angular, squared off, recess requires a greater amount of retraction of the pin tip 34 within passageway 33 in order for separation to occur.

In the embodiment illustrated in FIGS. 1-4C, the base member 20 and shaft 22 are able to rotate relative to the locking housing 30. For certain embodiments, it is believed that having a rotational capability between the base member 20 and the locking housing 30 is preferred. However, for other applications, the base member 20 and locking housing 30 may be configured such that rotation is not possible. As described elsewhere in an alternative embodiment, recess 24 may be provided by a simple aperture designed to mate with a single pin tip 34. In this manner, mated engagement between pin tip 34 and recess 24 shaped as a corresponding aperture may be used to prevent rotational movement between the shaft 22 and the locking housing 30. Similarly, using a shaft 22 having angular edge walls such as a triangular or rectangular shaft, would, when engaged in a correspondingly shaped opening 32, prevent rotation. Similarly, having a mated ridge and/or groove defined by the surface of shaft 22 would also prevent rotation and provide for a more precise alignment mechanism where needed between the base and the locking housing.

Figure 3:
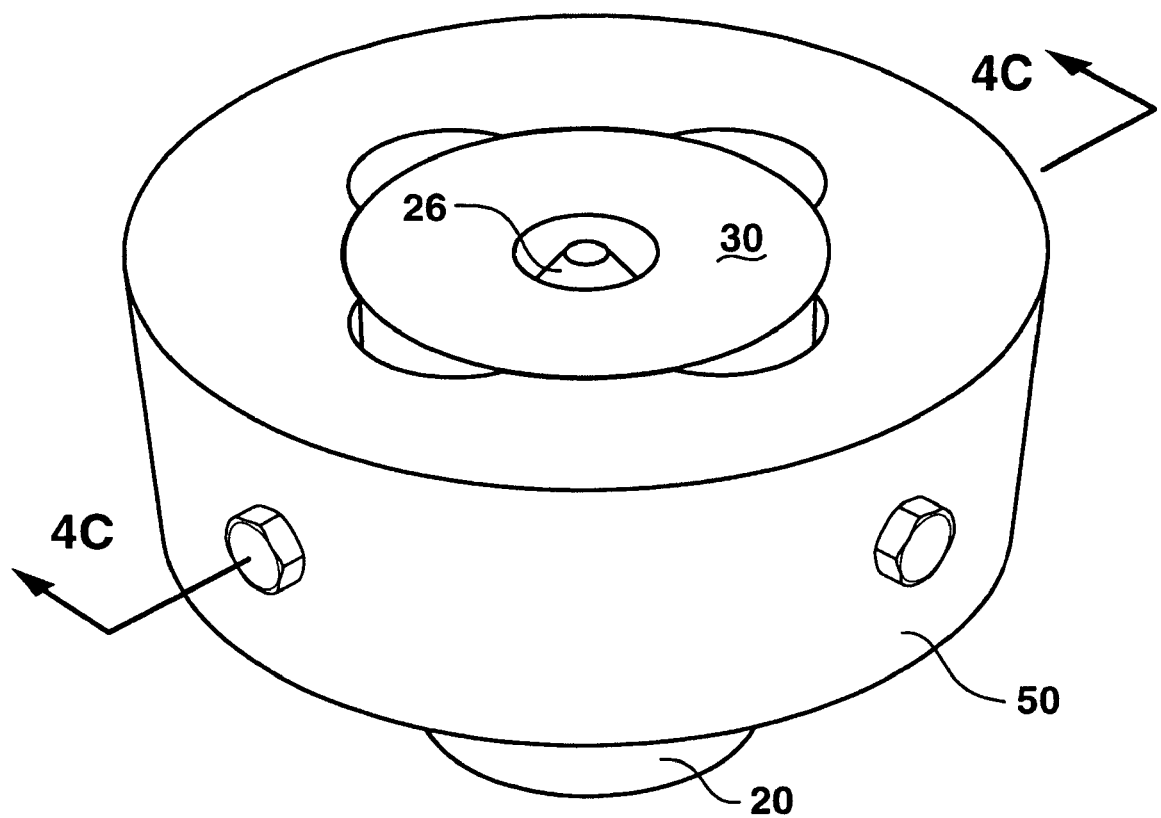
FIG. 3 is a perspective view showing the base member engaged within said locking member and the magnetic key positioned relative to the locking member so as to disengage the base member from the locking member.

As seen in reference to FIGS. 1-3, a key 50 may be provided having a central opening 52, opening 52 having disposed therein one or more magnets 54. As further seen in reference to FIG. 2 and FIG. 3, key 50 may be inserted over the interengaged base member 20 and locking housing 30 such that magnets 54 are positioned opposite passageways 33. When so configured, the magnets will cause pin base 36 and pin tip 34 to be withdrawn to a position in which pin tip 34 resides entirely within the passageway 33. As a result, base 20 and shaft 22 may be separated from the locking housing 30. Upon removal of magnet key 50 from the aligned position surrounding locking housing 30, pin tips 34 will again assume a position within bore 32 so as to again lock within recess 24 upon reinsertion of shaft 22 into passageway 33.

In the illustrated embodiment set forth above in reference to FIGS. 1-4C, the materials comprising base member 20 and housing 30 may be provided of a ferrous material or using non-ferrous materials such as stainless steel, non-ferrous metals, or rigid structural polymers such as nylon, high density polyetheylene, and other plastics. The use of a ferrous material for housing 30 is useful since the ferrous material will mask the locations of the concealed plungers. Use of a non-ferrous material for housing 30 could allow the location of magnetic pin base 36 and pin tip 34 to be easily detected with external magnets.

The materials making up the interengagement member should have a sufficient ferrous component such that the set screw 38, pin tip 34, and pin base 36 may be biased into a withdrawal position within bore 32. Preferably, pin base 36 has a sufficient ferrous content such that pin base 36 and accompanying pin tip 34 may be readily moved in response to the external magnets. If desired, pin tip 34 may be provided of a similar or dissimilar material from pin base 36. In addition, one having ordinary skill in the art will recognize that the length of protrusion of pin tip 34 into the corresponding recess 24 along with the shape of the terminal end of the pin tip 34 may influence the resulting strength of the coupled components. In addition, the thickness of the pin tip 34 as well as the materials used to supply pin tip 34 may also be varied so as to achieve a greater or lesser locking force between the structures.

Figure 5:
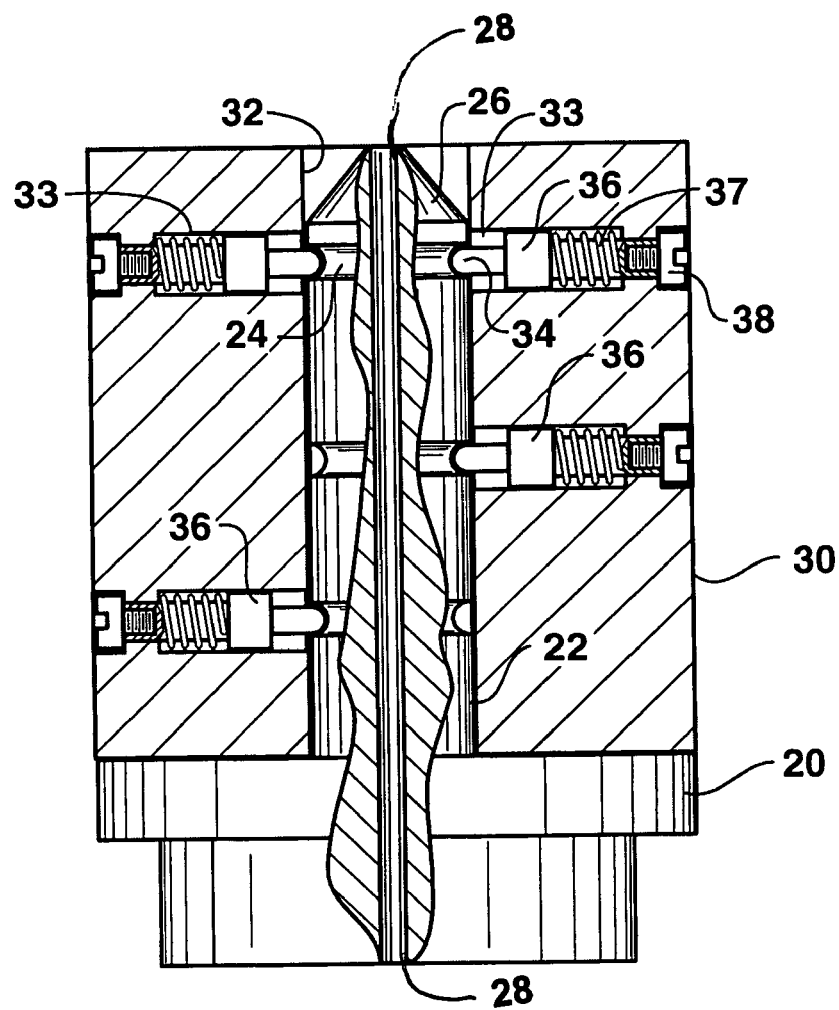
FIG. 5 is a perspective view of an alternative embodiment of the invention which sets forth multiple locations of recesses with corresponding pin tips.

As seen in reference to FIG. 5, a cross sectional view of an additional embodiment of a quick release magnetic coupling apparatus is provided. The alternative embodiment is similar in operation to the embodiment set forth in FIG. 4B, but includes a plurality of pin tips 34 and base members 36 along with a plurality of recesses 24 defined in shaft 22. While not separately illustrated in FIG. 5, it is recognized that additional sets of pin tips 34, base members 36, and corresponding passageways 33 may be located in other areas outside the sectional view of FIG. 5. By controlling the number and placement of the passageways 33 along with the accompanying pin tips 34 and base members 36, a more complex key 50 having specific locations of magnets 54 is needed to uncouple the apparatus.

As further seen in reference to FIG. 5, an axial bore 28 is defined which extends the length of the shaft 22 and base 20. This arrangement facilitates fluid communication between the device(s) associated with the base member 20 and/or a locking housing 30. As illustrated, bore 28 is in communication with the bore 32 defined by housing 30. The ability to maintain a fluid connection between the male and female portions of the magnetic coupling apparatus allow the magnetic coupling apparatus to be used in a variety of applications including connectors within a hydraulic system, a pneumatic system, irrigation systems, hose couplings, and similar uses where a tamper resistant connection is useful to prevent theft or unauthorized tampering. The use of a deeper recess 24 in combination with the sharp incline between the walls forming recess 24 and pin tip 34 sets forth a configuration where a greater amount of force is needed to achieve separation.

As set forth in FIG. 5, where the shaft 22 defines a number of recesses 24 which must pass multiple pin tip 34 locations before insertion, it is appreciated that the appropriate magnetic key must be operatively engaged with housing 30 in order for the full insertion of shaft 22 within bore 32 to occur. The ability to require an appropriate key to both lock and unlock the device may serve a useful role in preventing unauthorized use of equipment. For instance, the magnetic coupling device may be used as connectors for a pneumatic line. By unlocking the pneumatic connections, the equipment is rendered inoperative until the authorized operator with a key reconnects the supply line. In this manner, additional safeguards against unauthorized equipment use are made possible through the present invention. It is also envisioned that the present accompanying apparatus may also serve as an alignment mechanism for various electrical connectors. Again, requiring a key to both lock and unlock the electrical connector provides additional safeguards against unauthorized use or tampering.

Figure 7:
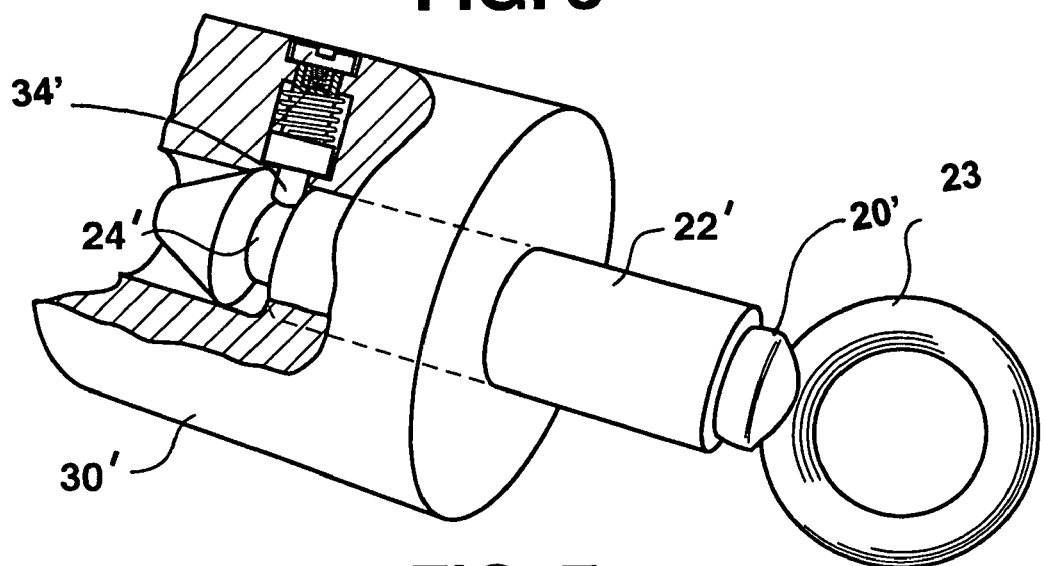
FIGS. 7 is a perspective view in partial section of an additional embodiment of a quick release connector.

As seen in reference to FIG. 7, an additional embodiment of a quick release magnetic coupling is provided. In this embodiment, shaft 22' is carried by a base 20', base 20' further connected to an eyelet 23. When inserted into the locking housing 30', recess 24' is interengaged by at least one pin tip 34' and pin base 36'. As illustrated, a portion of the shaft may extend from the locking housing 30' if desired. The eyelet 23 associated with base 20' provides a reversible anchor point which may be rotated and easily inserted and removed from the locking housing 30' by use of a mated magnetic key (not shown). In the illustrated embodiment, shaft 22' may be provided having a break-away configuration of a predetermined load value such that housing 30' will separate from shaft 22' in the event an excessive load is applied. The break-away is facilitated by the angle between the recessed groove 24' and shaft 22'. The use of rounded and gradual inclines between the walls forming recess 24' relative to pin tip 34', as seen in other embodiments, reduces the force needed to achieve a break-away configuration. This feature provides for enhanced safety for certain applications where a break-away function is useful.

A third embodiment of a quick release connector is seen in reference to FIGS. 6A through 6D. As seen in reference to FIGS. 6A through 6D, base 20" has attached thereto a segment of rectangular tubing which may be used to secure a variety of structural materials including boards, pipes, scaffolding components and similar materials. Base 20" further defines a projection 23 which extends the base as seen here in the form of a circular shaft having a tapered terminus. As seen in reference to FIG. 6A, when shaft 22" engages locking housing 30", the projection 23 is designed to mate with a corresponding opening 39 defined by housing 30" Since the base component 20" has two separate structures which are positioned within the interior of housing 30", rotation between the base 20" and the locking housing 30" will not occur. Additionally, in the embodiment seen in FIG. 6A, shaft 22" will not rotate relative to locking housing 30" by the nature of the recess 24". Since recess 24" is defined by a single aperture, the corresponding pin tip within the interior of bore 32" prevents any rotational or axial movement between shaft 22" and locking housing 30".

As an additional measure of security, it is envisioned that the locking housing 30" may be covered in an exterior sheath which hides the specific locations of the magnetic engagement members. As seen in reference to FIG. 6D, the set screw 38" is preferably flush with the exterior surface of housing 30" or countersunk below the surface so as to facilitate the placement of an exterior sheath which will conceal the location of the engagement members. In this way, it is more difficult for one to attempt unauthorized decoupling of the locking apparatus using external magnets. In addition, the flush/countersunk position of set screw 38" allows for a magnet 54" to be placed directly on top of the surface of housing 30" without requiring a specialized key 50" structure.

Figure 6B:
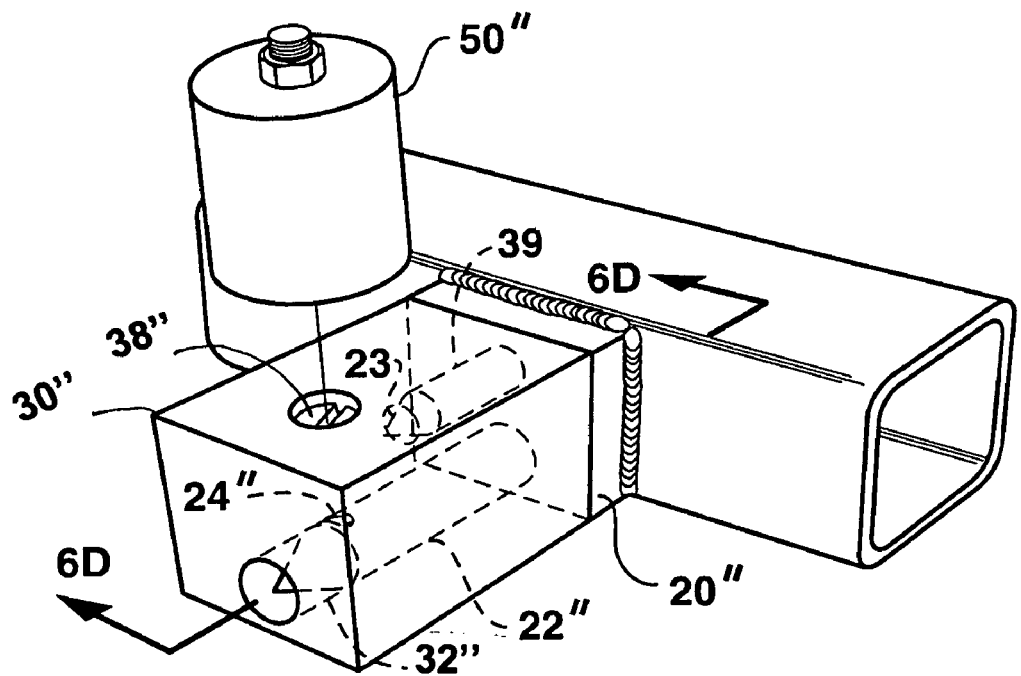
Figure 6C:
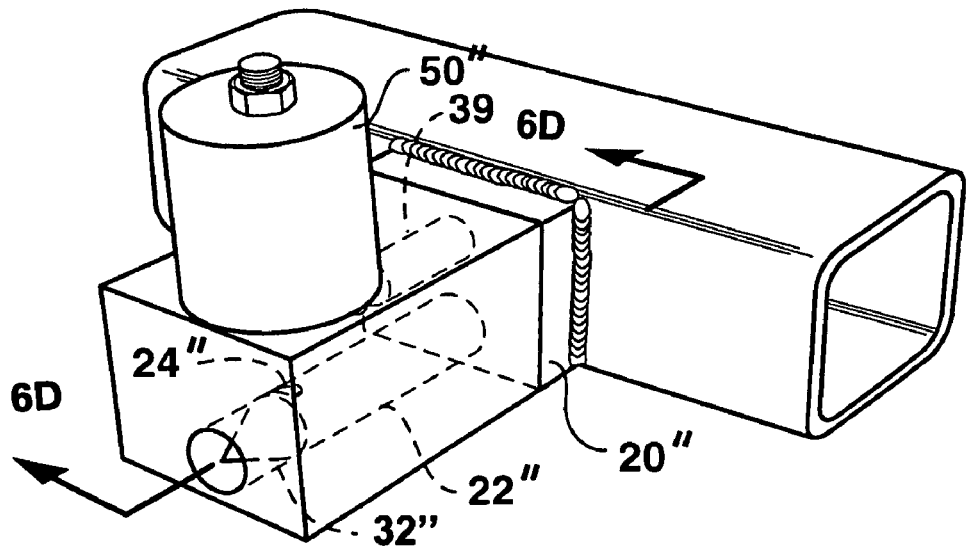
FIG. 6C shows the embodiment set forth in FIGS. 6A and 6B having the magnetic key placed to disengage an interengagement member from a recess provided on a shaft member.
Figure 6D:
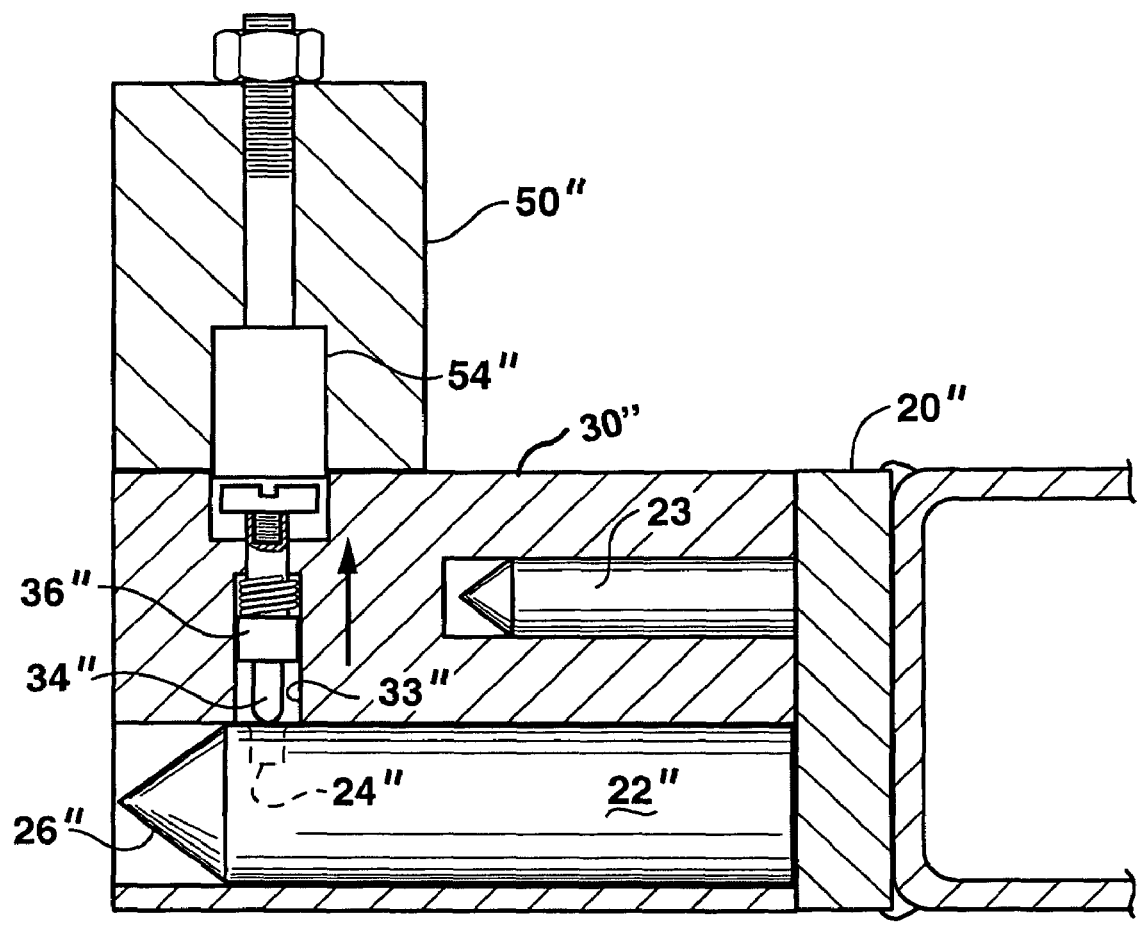
FIG. 6D is a sectional view taken along lines 6D-6D of FIG. 6C.

As illustrated in reference to FIG. 6D, the base 20" may be connected to the locking housing 30" in a manner which prevents both axial and rotational movement between the interlocked members. In the embodiment as illustrated, the base 20" having a structural tubing component associated therewith may be used as a hold fast or attachment member for a variety of materials using external magnets.

As seen in reference to FIG. 6D, a magnetic key 50" may be provided which places either a permanent earth magnet 54" and/or an electromagnet in proximity to the interengagement member within the interior of housing 30". In a manner similar to that described in reference to the above embodiments, the magnetic force serves to displace an interengagement member, thereby releasing shaft 22" from a locked engagement within the interior of locking housing 30". As is readily appreciated from observing the embodiment in FIG. 6D, proper placement of an earth magnet 54", absent a housing, or an appropriately positioned electromagnet may be used directly to disengage shaft 22" from the interior of locking housing 30".

While the illustrated embodiments set forth cylindrical shafts, a shaft 22 may be provided in any shape which corresponds to an appropriately shaped illustrated in the embodiments as a straight member, shaft 22 may also be curved. Additionally, while the embodiments set forth a shaft 22 having an enlarged base member 20, base member 20 may be defined by the terminal end of shaft 22.

The magnetic couplings provided herein offer a wide variety of uses and applications where a combination of a rapid assembly/disassembly of component parts is needed. Further, the nature of the magnetic key system is such that absent a dedicated key, the component parts are not easily removed. Accordingly, vandalism and theft of the structurally attached units are greatly curtailed.

The locking housing and base members of the present invention may be attached to a plurality of different objects so as to simplify the interconnection of various structures. Representative examples include temporary barricades or fence panels which may be joined edge to edge using the interconnect couplings. Field deployed equipment such as communication antennas or field scaffolding components may be easily erected in the field. Disassembly by using an appropriate magnetic key or keys is equally rapid. The assembled structures are also resistant to theft and tampering when coupled together since a specialized magnetic key is needed to unlock the devices.

The component parts of the coupling apparatus may be attached to opposite ends of a length of cable or chain to provide a locking system for bicycles and similar objects. In addition, an embodiment similar to that set forth in FIG. 7 may operate as "padlock" type devices for hasp-type closures for doors, fences, and lockboxes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed:

1. A magnetic coupling apparatus comprising:
   at least one shaft member of circular cross section, the shaft member defining a base and a tip at opposite ends thereof, an entire length of said shaft member defined between said ends, and at least one recess circumferentially encircling a portion of said shaft member;
   a lock housing defining an opening extending through opposite sides of said housing, a bore extending perpendicular to, and in communication with, said opening, said opening adapted for receiving said entire length of said shaft member;
   an interengagement member carried within said bore and adapted for slideably engaging with said at least one recess,
   a magnetic key slideably engagable with said lock housing to encircle an external portion of said lock housing, said interengagement member responsive to a magnetic force applied by said key effecting the interengagement member to move from an engaged position to a disengaged position;
   whereby when said interengagement member is in said engaged position, said interengagement member is slidingly engaged in said recess, locking said shaft member to prevent removal of said shaft member from said housing while allowing said shaft member to rotate with respect to said housing, and
   whereby when said interengagement member is in said disengaged position, said interengagement member is removed from said recess allowing removal of said shaft member from said housing in an axial direction of said shaft member.

2. The magnetic coupling apparatus according to claim 1 wherein said at least one shaft member is of one-piece homogeneous construction.

3. The magnetic coupling apparatus according to claim 1 wherein said at least one shaft member defines second and third recesses extending at least a portion of a length of said shaft member.

4. The magnetic coupling apparatus according to claim 1 wherein said shaft member defines a bore extending therethrough along a length of said shaft member, said bore allowing fluid communication between said shaft member and said housing.

5. The coupling apparatus according to claim 1 wherein said key member is removable from said lock housing.

6. The coupling apparatus according to claim 1 wherein said shaft member, said lock housing, and said key member are separate, non-unitary components.

7. The magnetic coupling apparatus according to claim 1 wherein said magnetic key has a key member housing defining an interior surface supporting at least one magnet that generates said magnetic force.

* * * * *